(12) United States Patent
Liu

(10) Patent No.: US 11,885,913 B2
(45) Date of Patent: Jan. 30, 2024

(54) LIDAR AND AUTOMOBILE

(71) Applicant: SUTENG INNOVATION TECHNOLOGY CO., LTD., Shenzhen (CN)

(72) Inventor: Shaoping Liu, Shenzhen (CN)

(73) Assignee: SUTENG INNOVATION TECHNOLOGY CO., LTD., Shenzhen (CN)

( * ) Notice: Subject to any disclaimer, the term of this patent is extended or adjusted under 35 U.S.C. 154(b) by 47 days.

(21) Appl. No.: 17/855,926

(22) Filed: Jul. 1, 2022

(65) Prior Publication Data
US 2022/0334230 A1 Oct. 20, 2022

Related U.S. Application Data

(63) Continuation of application No. PCT/CN2020/070216, filed on Jan. 3, 2020.

(51) Int. Cl.
*G01S 7/481* (2006.01)
*G01S 17/931* (2020.01)
(Continued)

(52) U.S. Cl.
CPC ........... *G01S 7/4817* (2013.01); *G01S 7/4811* (2013.01); *G01S 7/4813* (2013.01); *G01S 7/4815* (2013.01);
(Continued)

(58) Field of Classification Search
CPC .... G01S 7/4811; G01S 7/4812; G01S 7/4814; G01S 7/4815; G01S 7/4816;
(Continued)

(56) References Cited

U.S. PATENT DOCUMENTS

2006/0092004 A1 5/2006 Klotz et al.
2017/0003392 A1* 1/2017 Bartlett ................... G01S 17/10
(Continued)

FOREIGN PATENT DOCUMENTS

CN 109991586 A 7/2019
CN 110045498 A 7/2019
(Continued)

OTHER PUBLICATIONS

First Office Action issued in related Chinese Application No. 202080005438.2, dated Apr. 13, 2023, 17 pages.
(Continued)

*Primary Examiner* — Yuqing Xiao
*Assistant Examiner* — Benjamin Richard Hebert
(74) *Attorney, Agent, or Firm* — BAYES PLLC

(57) ABSTRACT

The present application discloses a LiDAR, which includes a base including a bearing surface, an adjusting structure located on the bearing surface, and a laser transceiving module including a plurality of laser transceiving devices. A galvanometer module of the LiDAR is fixed on the bearing surface. Each laser transceiving device is fixed on the adjusting structure, respectively. Each laser transceiving device is able to generate an outgoing laser emitted to the galvanometer module, respectively. The adjusting structure is configured so that each of the laser transceiving devices has a corresponding distance from the bearing surface, and therefore, the outgoing lasers generated by each of the laser transceiving devices form a preset laser detection field of view outside the LiDAR.

10 Claims, 14 Drawing Sheets

(51) Int. Cl.
*G01S 7/497* (2006.01)
*G01S 17/08* (2006.01)

(52) U.S. Cl.
CPC .......... *G01S 7/4972* (2013.01); *G01S 17/08* (2013.01); *G01S 17/931* (2020.01)

(58) Field of Classification Search
CPC ...... G01S 7/4817; G01S 7/4972; G01S 17/04; G01S 17/06; G01S 17/08; G01S 17/10; G01S 17/93; G01S 17/932; G02B 26/0816; G02B 26/10; G02B 26/105
See application file for complete search history.

(56) References Cited

U.S. PATENT DOCUMENTS

2018/0176471 A1* 6/2018 Wippermann ..... G02B 13/0065
2020/0341116 A1* 10/2020 Smith .................. G01S 17/89

FOREIGN PATENT DOCUMENTS

| CN | 110346811 A | 10/2019 | |
| CN | 110398724 A | 11/2019 | |
| CN | 110488250 A | 11/2019 | |
| CN | 110632618 A | 12/2019 | |
| DE | 102005007945 A1 | 8/2006 | |
| WO | 2012144341 A1 | 10/2012 | |
| WO | WO-2020098771 A1 * | 5/2020 | ............ G01S 7/4811 |
| WO | WO-2020135802 A1 * | 7/2020 | ............ G01S 17/08 |

OTHER PUBLICATIONS

International Search Report issued in corresponding International Application No. PCT/CN2020/070216, dated Mar. 27, 2020, 2 pages.

* cited by examiner

LIDAR AND AUTOMOBILE

CROSS-REFERENCE TO RELATED APPLICATION

The present application is a continuation of International Application No. PCT/CN2020/070216, filed on Jan. 3, 2020, the contents of which is incorporated herein by reference in its entirety.

TECHNICAL FIELD

This application relates to the technical field of laser detection, and in particular, to a LiDAR and an automobile.

BACKGROUND

A LiDAR is a radar system that emits a laser beam to detect characteristic parameters of a target object, such as location and speed. The working principle of the LiDAR is that an emission module first emits an outgoing laser signal for detection to the target, a receiving module then receives a reflected laser signal from the target object, and the LiDAR compares the outgoing laser signal with the reflected laser signal, to obtain relevant information of the target object after processing, for example, parameters such as distance, azimuth, height, speed, posture, and even shape.

When the LiDAR has a plurality of laser transceiving devices, a distance from each laser transceiving device to a galvanometer device and a deflection angle of the laser transceiving device relative to the galvanometer device affect a detection field of view corresponding to each reflecting device. In order to make the detection field of view meet a requirement, the laser transceiving device which emits a laser beam with a larger deflection angle from the galvanometer device is adjusted to be farther away from the galvanometer device. However, such a structural arrangement increases an overall volume of the LiDAR.

SUMMARY

The present application provides a LiDAR and an automobile, and can reduce the space occupied by the LiDAR.

According to an aspect of the present application, a LiDAR is provided, which includes:
- a base including a bearing surface, a galvanometer module of the LiDAR being fixed on the bearing surface;
- an adjusting structure located on the bearing surface;
- a laser transceiving module including a plurality of laser transceiving devices, each of the laser transceiving devices being fixed to the adjusting structure, respectively, and each of the laser transceiving devices being able to generate an outgoing laser emitted to the galvanometer module, respectively,
- where the adjusting structure is configured so that each laser transceiving mounted on the adjusting structure has a corresponding distance from the bearing surface. Therefore, the outgoing lasers generated by each laser transceiving form a preset laser detection field of view outside the LiDAR.

According to some embodiments, the adjusting structure includes a plurality of first convex platforms arranged on the bearing surface. Each laser transceiving device is connected to each of the first convex platforms in a one-to-one correspondence. A measurement of each of the first convex platforms in a direction that is perpendicular to the bearing surface is equal to a distance from the laser transceiving device connected to each of the first convex platforms to the bearing surface, and each of the first convex platforms is integrally provided with the base.

According to some embodiments, the LiDAR further includes a reflecting module. The reflecting module and the laser transceiving module are arranged on two sides of the galvanometer module, respectively. The reflecting module faces a galvanometer surface of the galvanometer module. The reflecting module includes a plurality of mirrors. Each mirror is configured to reflect the outgoing laser generated by each laser transceiving module to the galvanometer surface in a one-to-one correspondence.

According to some embodiments, each of the mirrors is arranged on the adjusting structure, respectively. The adjusting structure is configured so that each of the mirrors mounted on the adjusting structure has a corresponding distance from the bearing surface. Therefore, an outgoing laser reflected by each of the mirrors is directed to the galvanometer surface along a preset path.

According to some embodiments, the adjusting structure further includes a plurality of second convex platforms arranged on the bearing surface. Each of the mirrors is connected to each of the second convex platforms in a one-to-one correspondence. A measurement of each of the second convex platforms in a direction that is perpendicular to the bearing surface is equal to the distance from the mirror connected to each of the second convex platforms to the bearing surface, and each of the second convex platforms is integrally provided with the base.

According to some embodiments, each of the mirrors is arranged around the galvanometer surface, and the LiDAR has an intermediate optical path axis located in a middle of a detection area. The adjusting structure is configured so that the farther away the mirror is from the intermediate optical path axis, the greater a distance from the mirror to the bearing surface is.

According to some embodiments, the base further includes an outer wall surface opposite to the bearing surface. The outer wall surface is located outside the LiDAR. A plurality of first heat dissipation grooves are provided on the outer wall surface. Each of the first heat dissipation grooves is arranged within an orthographic projection area of each of the first convex platforms on the outer wall surface in a one-to-one correspondence.

According to some embodiments, the base further includes an outer wall surface opposite to the bearing surface. The outer wall surface is located outside the LiDAR. A plurality of second heat dissipation grooves are arranged on the outer wall surface. Each of the second heat dissipation grooves is arranged within an orthographic projection area of each of the second convex platforms on the outer wall surface in a one-to-one correspondence.

According to some embodiments, the galvanometer module includes a bracket and a galvanometer device. The bracket is connected to the bearing surface, and the galvanometer device is arranged on the bracket. The bracket includes a clearance channel. The outgoing laser generated by each of the laser transceiving devices passes through the clearance channel and is emitted to each of the mirrors in a one-to-one correspondence.

According to some embodiments, the galvanometer module further includes a light shielding plate. The light shielding plate is arranged in the clearance channel for shielding light reflected by the reflecting module to the laser transceiving module. The light shielding plate includes a plurality of relief holes. The outgoing laser generated by each of the laser transceiving devices correspondingly passes through one relief hole and is emitted to the mirrors.

According to a second aspect of the present application, an automobile is provided, which includes: a LiDAR of any of the forgoing embodiments and an automobile body, the LiDAR being mounted outside the automobile body or embedded in the automobile body.

The present application provides a LiDAR, including a base, an adjusting structure, a laser transceiving module, and a galvanometer module. In this application, in order to make a laser detection field of view corresponding to each of the laser transceiving devices meet a requirement, a distance from each of the laser transceiving devices to a galvanometer is not adjusted, but a distance from each of the laser transceiving devices to a bearing surface of the base and an angle between each of the laser transceiving devices and the bearing surface of the base are adjusted by the adjusting structure. With an arrangement of this structure, the distance from the laser transceiving device to the bearing surface of the base can be adjusted by setting a height of the structure. A distance from a galvanometer device to the laser transceiving device and a deflection angle between the galvanometer device and the laser transceiving device are further adjusted, so as to adjust a detection field-of-view offset corresponding to the reflecting device at an edge thereof. This ensures an overall detection efficiency of the LiDAR for a target detection area while avoiding that a volume of the LiDAR is forced to increase due to adjustment in the detection field of view, thereby reducing an overall space occupied by the LiDAR.

BRIEF DESCRIPTION OF DRAWINGS

To describe the technical solutions in the embodiments of this application or in the related art more clearly, the following briefly describes the accompanying drawings required for describing the embodiments or the related art. Apparently, the accompanying drawings in the following description show merely some embodiments of this application, and a person skilled in the art may still derive other drawings from these accompanying drawings without creative efforts.

DETAILED DESCRIPTION

To make the objectives, technical solutions, and advantages of this application more comprehensible, the following further describes this application in detail with reference to accompanying drawings and embodiments. It should be understood that the specific embodiments described herein are merely used to explain this application but are not intended to limit this application.

A LiDAR is a radar system that emits a laser beam to detect characteristic parameters of a target object, such as location and speed. A working principle of the LiDAR is that an emission module first emits an outgoing laser signal for detection to the target, a receiving module then receives a reflected laser signal from the target object, and the LiDAR compares the outgoing laser signal with the reflected laser signal, to obtain relevant information of the target object after processing, for example, parameters such as distance, azimuth, height, speed, posture, and even shape.

The LiDAR includes a laser transceiving device and a galvanometer device. The light generated by the laser transceiving device is emitted to the galvanometer device. The galvanometer device directs an outgoing laser towards a detection area along a preset path through displacement and deflection. The LiDAR can have a plurality of laser transceiving devices. Each of the laser transceiving devices correspondingly emits laser to the galvanometer device, respectively.

Figure 1:
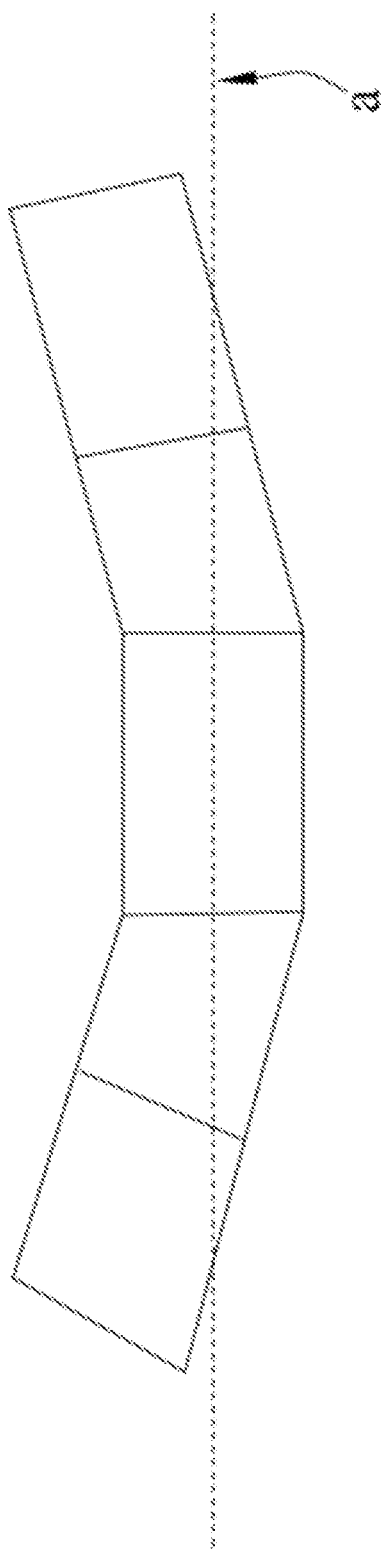
FIG. 1 shows a schematic diagram of a laser detection field of view of a LiDAR in the related art, wherein an a-axis shows a horizontal 0-degree field-of-view alignment line.
Figure 2:
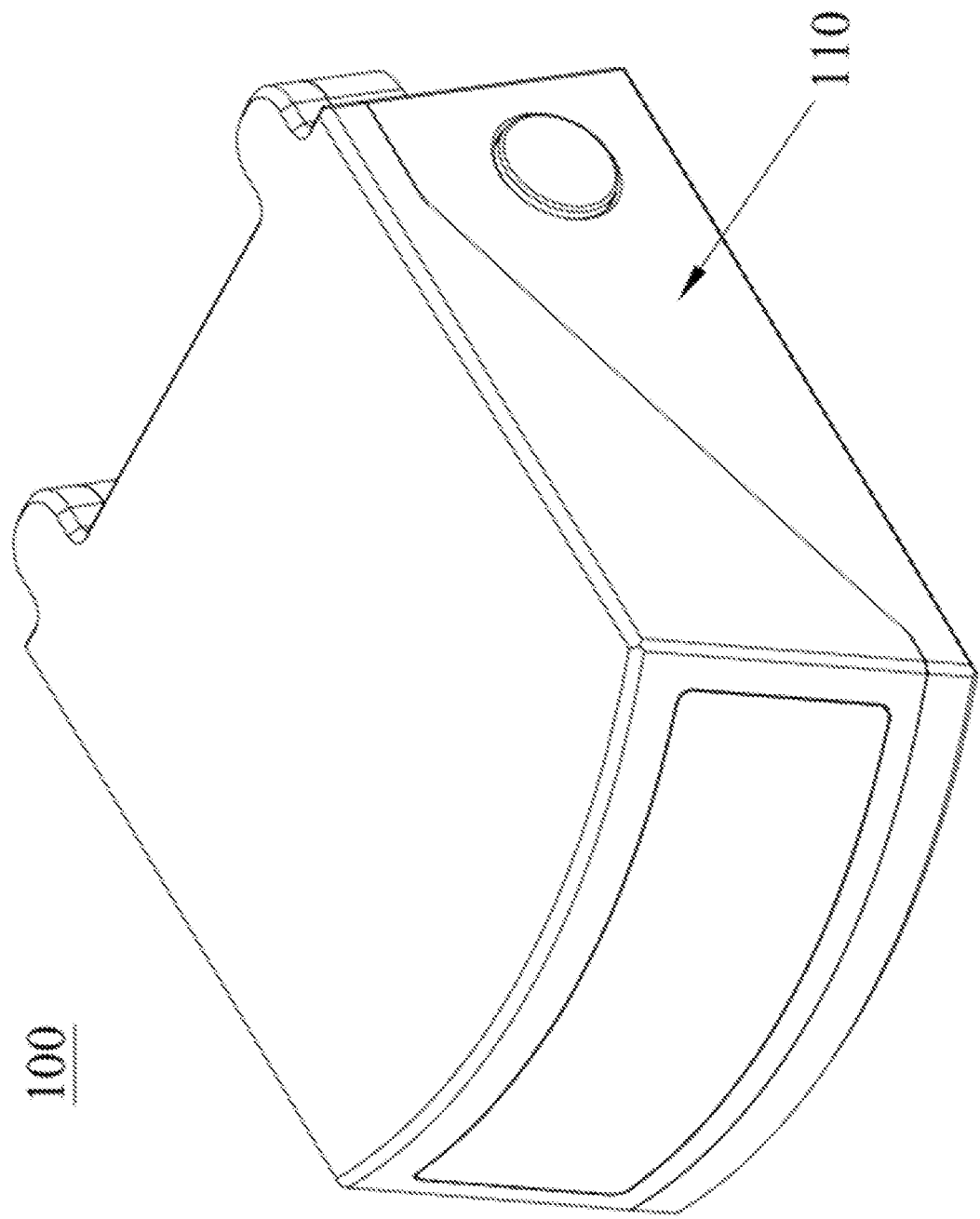
FIG. 2 shows a perspective diagram of a LiDAR of an embodiment of this application.

When the LiDAR has a plurality of the laser transceiving devices, a distance from the galvanometer device to each of the laser transceiving devices and a deflection angle between the galvanometer device and each of the laser transceiving devices affect a detection field of view corresponding to each of the laser transceiving devices. The laser transceiving device at an edge thereof is farther relative to the galvanometer device. A relative deflection angle is larger, so the detection field of view generated moves upwards and deviates from a horizontal 0-degree detection field of view. FIG. 1 shows five detection fields of view. An edge detection field of view at both sides deviates upwards from an alignment line a of the horizontal 0-degree detection field of view. It can be understood that the horizontal 0-degree detection field of view is a target detection region. When the edge detection field of view deviates from a horizontal detection field of view, an edge transceiving device cannot detect an object at a target region, which affects an overall detection efficiency of the LiDAR for the target region.

Figure 3:
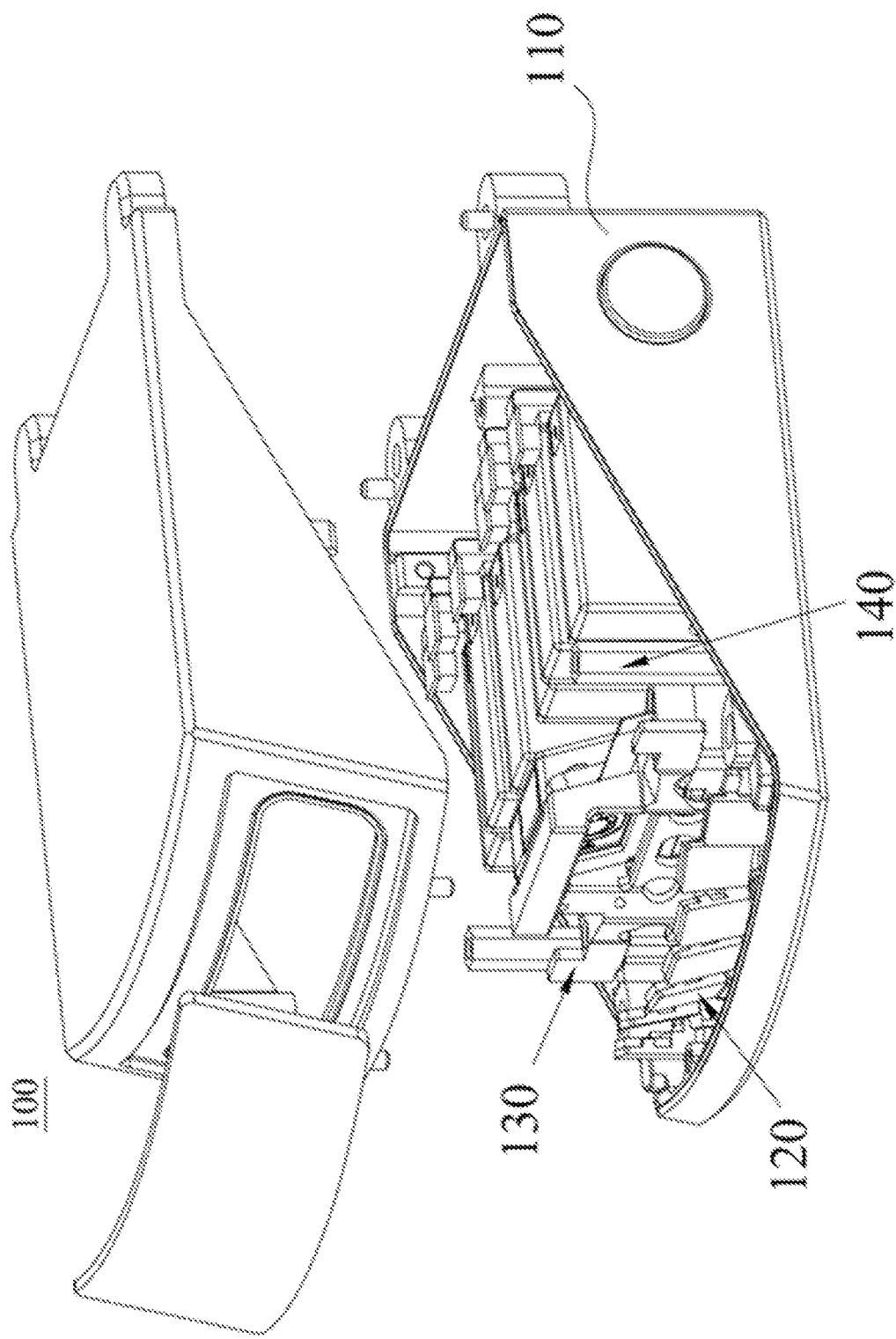
FIG. 3 shows an exploded schematic diagram of a LiDAR of an embodiment of this application.
Figure 4:
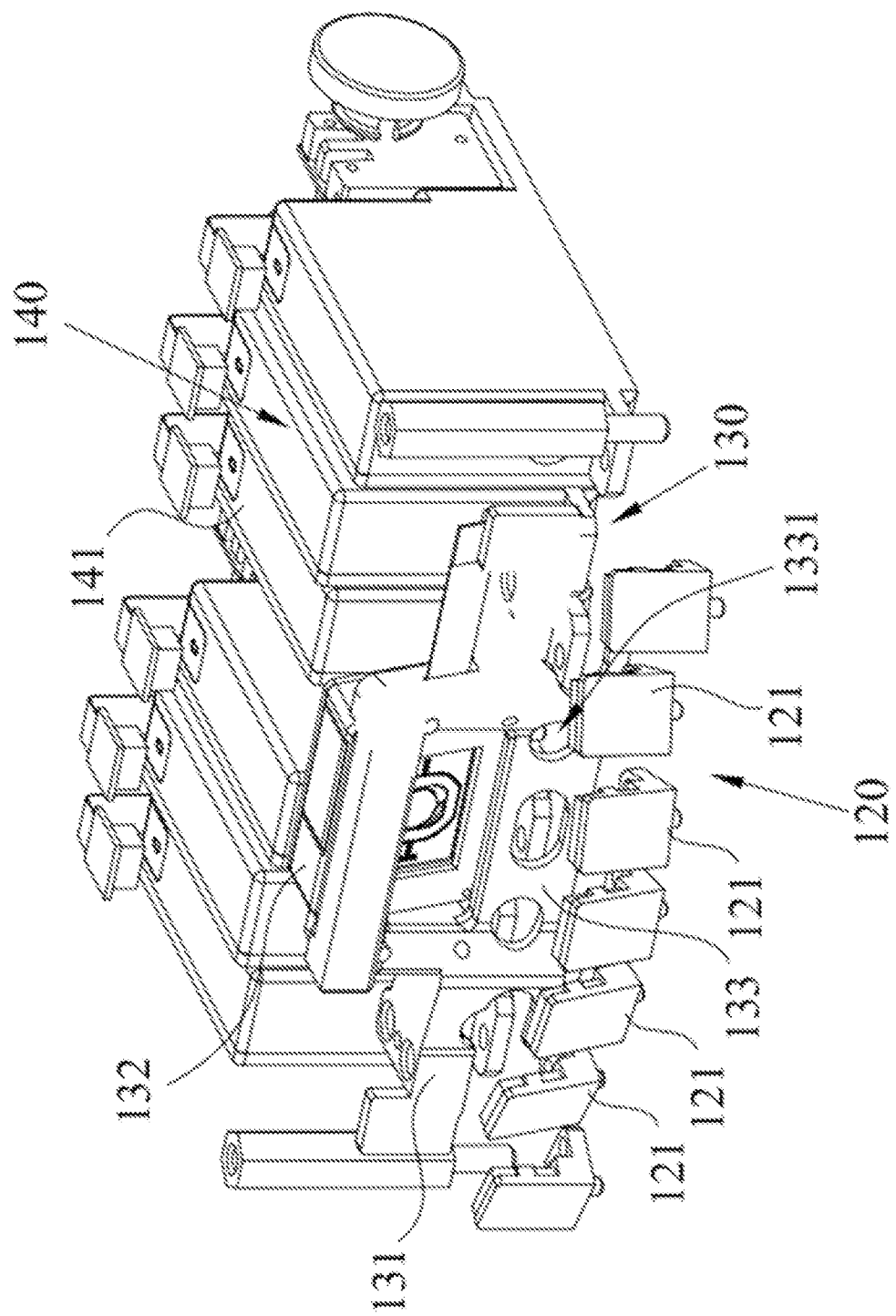
FIG. 4 shows a perspective diagram of a combination of a reflecting module, a galvanometer module, and a laser transceiving module of an embodiment of this application.
Figure 5:
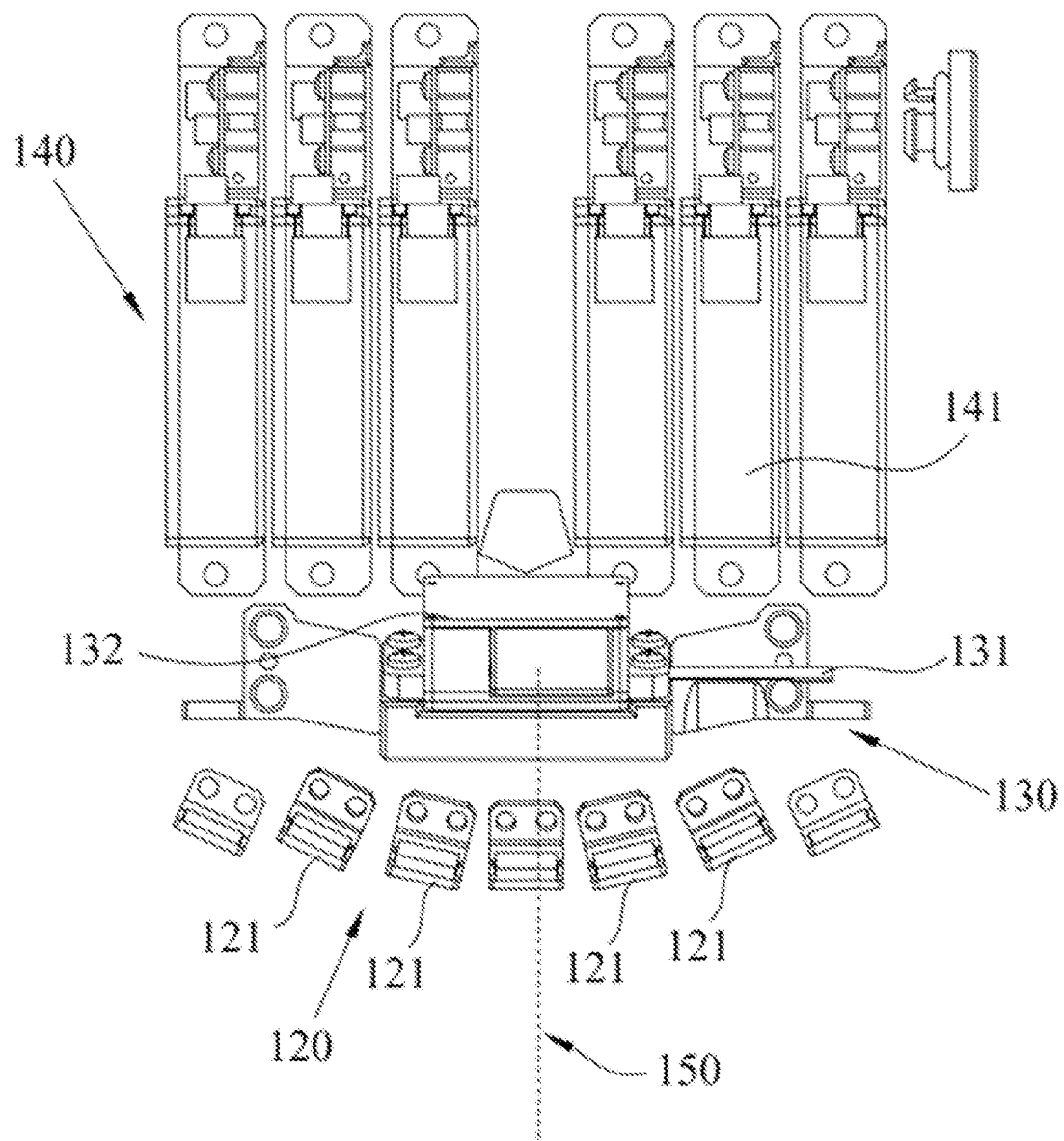
FIG. 5 shows a schematic top view of a combination of a reflecting module, a galvanometer module, and a laser transceiving module of an embodiment of this application.

As shown in FIG. 2 to FIG. 12, the embodiment provides a LiDAR 100. The LiDAR 100 has a plurality of laser transceiving devices 141. Under the premise that a reflected laser field of view formed by each of the laser transceiving devices 141 meets a requirement, the LiDAR 100 in this embodiment can make a volume of the LiDAR 100 smaller. Specifically, the LiDAR 100 in this embodiment includes a shell, a laser transceiving module 140, and a reflecting module 120 (in other embodiments, the reflecting module 120 may not be included, and the addition of the reflecting module 120 can further reduce the volume of the LiDAR 100) and the galvanometer module 130. It should be noted that for convenience of description, in this embodiment, it is defined that the LiDAR 100 has an intermediate optical path axis 150 (for example, as shown in FIG. 5) arranged in the middle of a detection region. For the intermediate optical path axis 150, it can be understood that the LiDAR 100 points at an axis 150 in a straightly forward direction.

Figure 9:
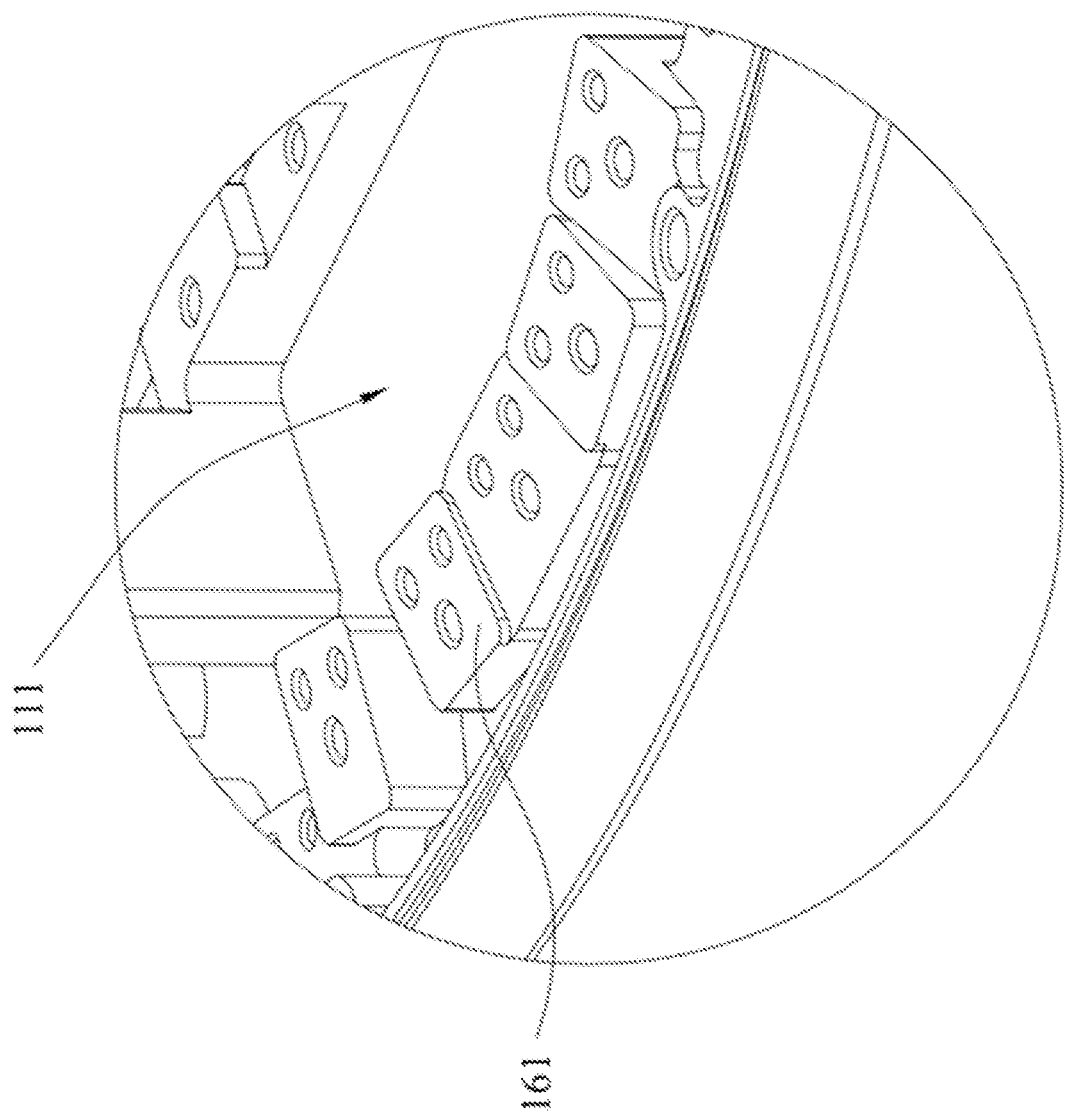
FIG. 9 shows a partially enlarged schematic diagram of A in FIG. 8.

The shell includes a base 110, and the base 110 can be a regular plate-shaped member or an irregular structure. The base 110 can be arranged inside the LiDAR 100 to provide a carrier for other components of the LiDAR 100. The base 110 can also be a part of the shell of the LiDAR 100. The base 110 includes a bearing surface 111 (for example, as shown in FIG. 9) facing an inside of the LiDAR 100, and the galvanometer module 130 of the LiDAR 100 is fixed on the bearing surface 111. The bearing surface 111 can be a plane or an irregular curved surface, and the specific shape of the bearing surface 111 depends on specific assembly requirements.

Figure 8:
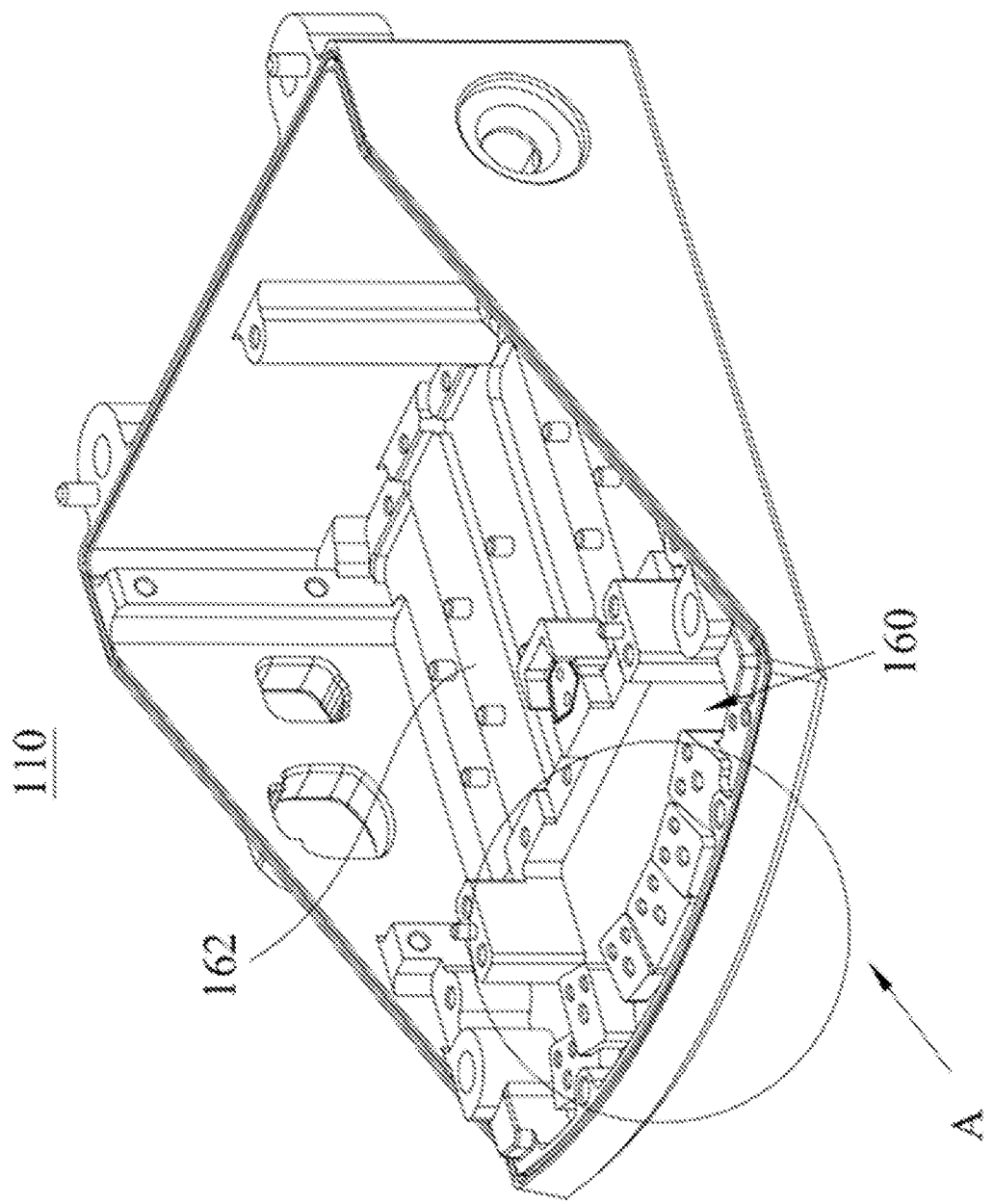
FIG. 8 shows a first perspective diagram of a base of an embodiment of this application.

The bearing surface 111 of the base 110 is provided with an adjusting structure 160 (for example, as shown in FIG. 8) for adjusting a distance from the reflecting module 120 to the bearing surface 111. The adjusting structure 160 can be an independent component and is connected to the bearing surface 111. For example, the adjusting structure 160 can be bonded or threaded to the bearing surface 111. The adjusting structure 160 can also be integrally provided with the base 110, that is, the adjusting structure 160 is a convex or concave structure on the bearing surface 111 of the base 110.

The reflecting module 120 includes a plurality of mirrors 121, and each of the mirrors 121 is configured to reflect an outgoing laser from the LiDAR 100 to the galvanometer module 130, respectively. As shown in FIG. 3 to FIG. 5, the reflecting module 120 in FIG. 5 has seven parts for reflection, but the three reflecting parts in the middle and on both ends in this application are configured to detect and scan the ROI region, belonging to the ROI region detecting mirror, so they are not used as mirror 121 in this embodiment.

Figure 6:
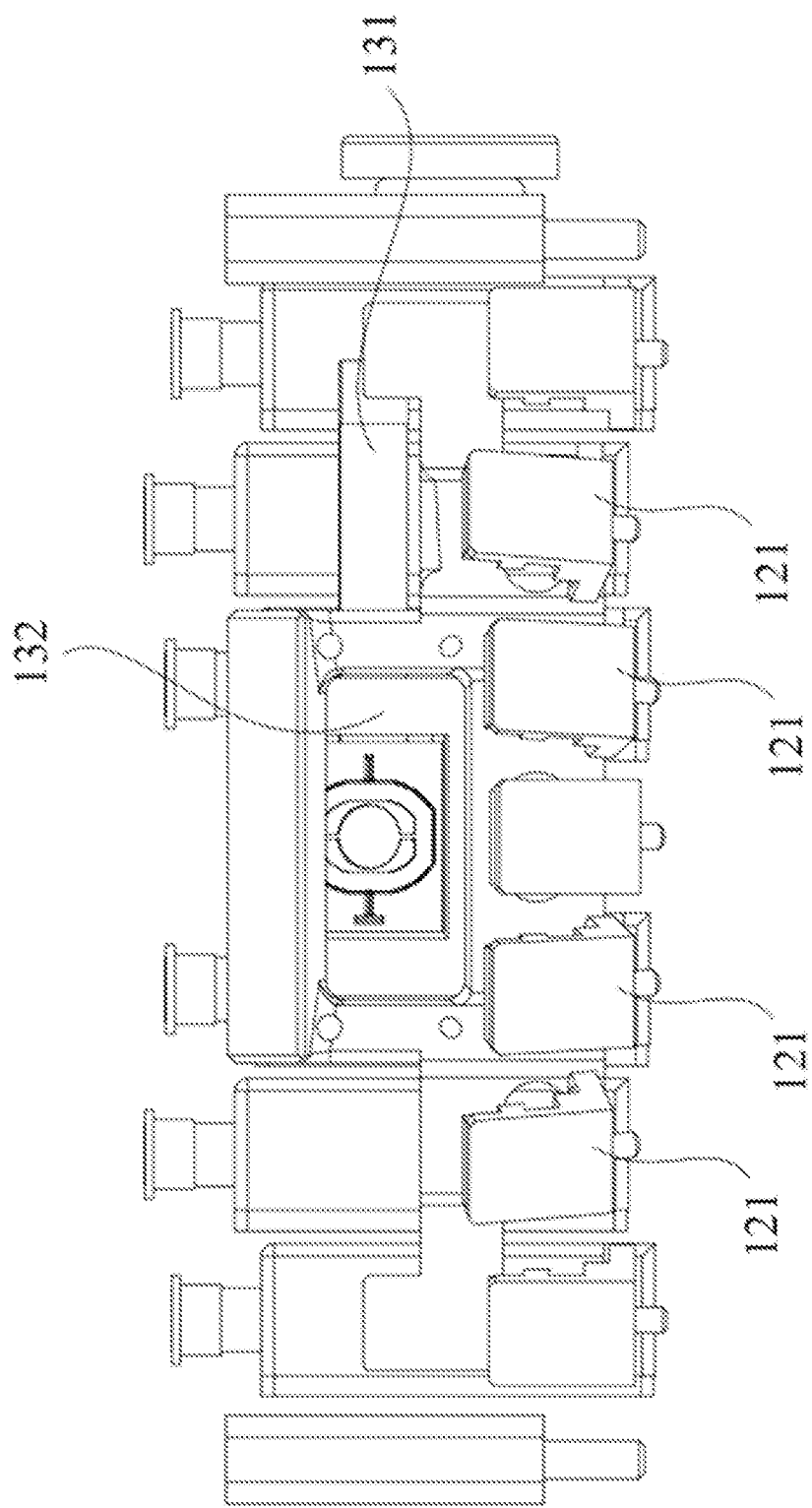
FIG. 6 shows a schematic front view of a combination of a reflecting module, a galvanometer module, and a laser transceiving module of an embodiment of this application.
Figure 7:
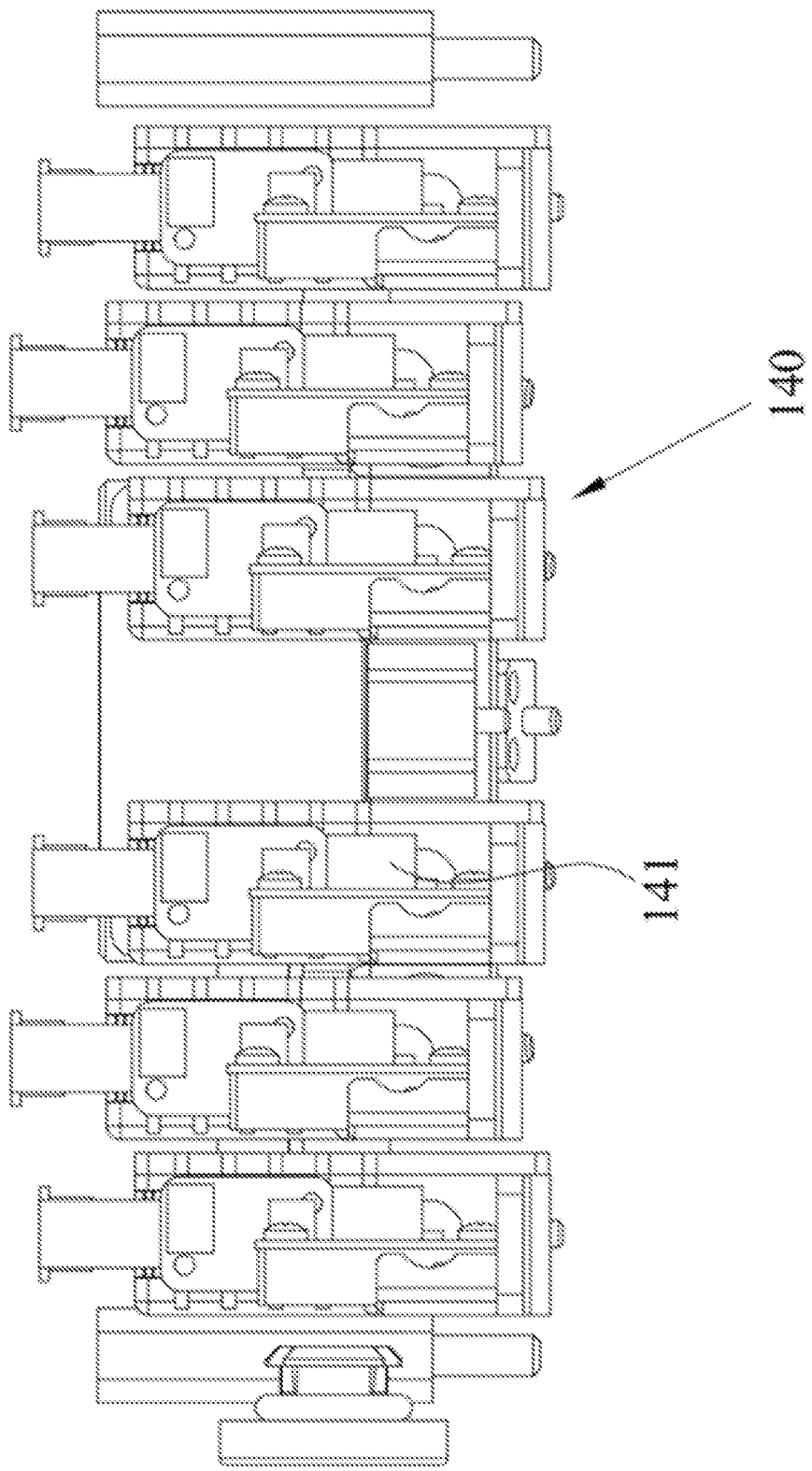
FIG. 7 shows a schematic rear view of a combination of a reflecting module, a galvanometer module, and a laser transceiving module of an embodiment of this application.

In this embodiment, the reflecting module 120 includes four mirrors 121 (in other embodiments, the number of mirrors is not limited, which may be two or more), and each mirror 121 independently receives the outgoing laser located inside the LiDAR 100, and reflects the outgoing laser to the galvanometer module 130. Particularly, each of the mirrors 121 is fixed to the adjusting structure 160, respectively, where the adjusting structure 160 is configured so that each of the mirrors 121 mounted on the adjusting structure has a corresponding distance from the bearing surface 111 (for example, as shown in FIG. 6, the mirrors 121 that are arranged on both sides of an intermediate optical path axis 150 and to which distances from the intermediate optical path axis 150 are the same have the same height 121), so that the outgoing laser reflected by each of the mirrors 121 outwards forms a preset laser detection field of view (which can specifically be an optimal laser detection field of view) at the LiDAR 100. In other optional embodiments, after the mirror 121 is mounted in the adjusting structure 160, the distances from each of the mirrors 121 to the bearing surface 111 can also be different, so that the outgoing lasers reflected by each of the mirrors 121 are in the best state in the laser detection field of view formed outward by the LiDAR 100.

It should be noted that in this embodiment, when the adjusting structure 160 all protrudes from the bearing surface 111, the distance from the mirror 121 to the bearing surface 111 is determined based on a part of the mirror 121 closest to the bearing surface 111 as a reference, instead of a center of the mirror 121 as a reference. Since the adjusting structure 160 can raise the mirror 121 corresponding to the outgoing laser that deviates from the intermediate optical path axis 150 by a certain distance relative to the bearing surface 111, this structure can offset the influence on a laser detection region caused by the deviation of this structure from the intermediate optical path axis 150. After the mirror 121 is raised, the space occupied by the mirror 121 is an original surplus space, so this structure does not occupy an additional volume, so that an overall volume of the LiDAR 100 remains unchanged. Therefore, compared with the LiDAR in the related art, the volume of the LiDAR 100 in this embodiment can be smaller.

When the adjusting structure 160 and the base 110 are integrally arranged, the adjusting structure 160 can be a convex platform on the bearing surface 111 or can be a groove on the bearing surface 111. Alternatively, one part of the adjusting structure is the convex platform on the bearing surface 111 and the other part of the adjusting structure is the groove on the bearing surface 111. In the above three cases, an arrangement height from the mirror 121 to the base 110 can be adjusted. When the adjusting structure 160 is the convex platform on the bearing surface 111, the adjusting structure 160 can include a plurality of second convex platforms 161 arranged on the bearing surface 111, and each of the mirrors 121 is connected to each of the second convex platforms 161 in a one-to-one correspondence. A measurement of each of the second convex platforms 161 in a direction perpendicular to the bearing surface 111 is equal to a distance from the mirror 121 connected to each of the second convex platforms to the bearing surface 111. That is, the arrangement height from each of the mirrors 121 to the base 110 is determined by the measurement of each of the second convex platforms 161 in the direction perpendicular to the bearing surface 111. The larger the measurement of the second convex platform 161 in the direction perpendicular to the bearing surface 111 is, the larger the distance from the corresponding mirror 121 to the bearing surface 111 is. The smaller the measurement of the second convex platform 161 in the direction perpendicular to the bearing surface 111 is, the smaller the distance from the corresponding mirror 121 to the bearing surface 111 is.

Figure 10:
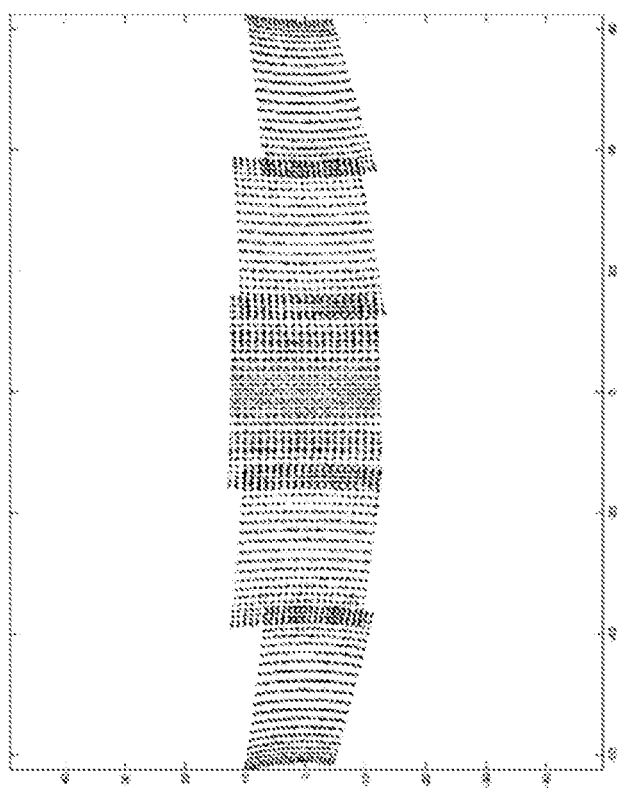
FIG. 10 shows a schematic diagram of a laser detection field of view of a LiDAR in the related art, wherein an abscissa is a horizontal field of view, and an ordinate is a vertical field of view.

In order to facilitate the positional arrangement of the plurality of mirrors 121, each of the mirrors 121 can be arranged around the galvanometer module 130. Specifically, a projection of the center of each of the mirrors 121 on the bearing surface 111 can be arranged in a common arc. When each of the mirrors 121 is arranged according to the above structure, to obtain an optimal detection field of view, the adjusting structure 160 can be configured to make a distance from the mirror 121 deviating farther from the intermediate optical path axis 150 to the bearing surface 111 greater. That is, the farther the second convex platform deviates from the intermediate optical path axis 150, the larger the measurement of the second convex platform 161 perpendicular to the bearing surface 111 is. In this way, the height of the field of view corresponding to the mirror 121 located far away from the intermediate optical path axis 150 deviating from a center 0-degree field of view alignment line can be reduced. A specific detection field-of-view effect is shown in FIG. 10, thereby improving the detection efficiency of a detection module at an edge thereof. In turn, the overall detection efficiency of the LiDAR is improved.

The LiDAR 100 includes the laser transceiving module 140, and the laser transceiving module 140 is arranged in the shell of the LiDAR 100. As shown in FIG. 5, in this embodiment, the reflecting module 120 is arranged on one side of the galvanometer module 130, and the laser transceiving module 140 is arranged on the side of the galvanometer module 130 away from the reflecting module 120. The laser transceiving module 140 includes a plurality of the laser transceiving devices 141, and an outgoing laser generated by each of the laser transceiving devices 141 is emitted to each of the mirrors 121 in a one-to-one correspondence. The number of laser transceiving devices 141 can be the same as the number of mirrors 121, in a one-to-one correspondence. Of course, in other embodiments, the number of the laser transceiving devices 141 can be more than the number of the mirrors 121, and the outgoing lasers generated by the plurality of laser transceiving devices 141 are emitted to the same mirror 121 at the same time. When the laser transceiving module 140 and the reflecting module 120 are arranged on both sides of the galvanometer module 130, respectively, the integration degree of the LiDAR 100 can be improved, and the overall occupied space of the LiDAR 100 can be reduced.

The laser transceiving device 141 can be fixed to the base 110 and other positions in the shell. To achieve better uniformity, each laser transceiving device 141 can be fixed to the base 110. When the laser transceiving device 141 is fixed to the base 110, each of the laser transceiving devices 141 is arranged at the adjusting structure 160. The adjusting structure 160 is configured so that each laser transceiving device 141 mounted on the adjusting structure has a corresponding distance from the bearing surface 111. Therefore, the outgoing laser generated by each of the laser transceiving devices 141 is emitted to the corresponding mirror 121 along a preset path. The above structure enables each of the laser transceiving devices 141 to correspond to the position of each of the mirrors 121.

Likewise, the whole part of the adjusting structure 160 connected to the laser transceiving device 141 can be the convex platform on the bearing surface 111 or can be the groove on the bearing surface 111. Alternatively, the part of the adjusting structure 160 connected to the laser transceiving device 141 can partly be the convex platform on the bearing surface 111 and partly be the groove on the bearing surface 111. In the foregoing three cases, the arrangement height from the laser transceiving device 141 to the base 110 can be adjusted. When the part of the adjusting structure 160 connected to the laser transceiving device 141 is the convex platform arranged on the bearing surface 111, the adjusting structure 160 further includes a plurality of first convex platforms 162 arranged on the bearing surface 111. Each of the laser transceiving devices 141 is connected to each of the first convex platforms 162 in a one-to-one correspondence. The measurement of each of the first convex platforms 162 in the direction perpendicular to the bearing surface 111 is equal to a distance from the laser transceiving device 141 connected to the first convex platform 162 to the bearing surface 111. That is, the arrangement height from each of the laser transceiving devices 141 to the base 110 is determined by the measurement of each of the first convex platforms 162 in the direction perpendicular to the bearing surface 111. The larger the measurement of the first convex platform 162 in the direction perpendicular to the bearing surface 111 is, the larger a distance from the corresponding laser transceiving device 141 to the bearing surface 111 is. The smaller the measurement of the first convex platform 162 in the direction perpendicular to the bearing surface 111 is, the smaller a distance from the corresponding laser transceiving device 141 to the bearing surface 111 is.

In an embodiment, when a certain laser transceiving device 141 emits laser to a certain mirror 121, it can be considered that the laser transceiving device 141 corresponds to the mirror 121, and the first convex platform 162 to which the laser transceiving device 141 is connected corresponds to the second convex platform 161 connected to this mirror 121. Particularly, the size of the first convex platform 162 and the second convex platform 161 corresponding to each other perpendicular to the bearing surface 111 can be the same, so that the raised height of the laser transceiving device 141 and the mirror 121 corresponding to each other are the same.

In an embodiment, the base 110 can be an outer shell of the LiDAR 100, wherein the bearing surface 111 of the base 110 is a wall surface of the base 110 facing an inside of the LiDAR 100. Additionally, the base 110 further includes an outer wall surface 112 opposite to the bearing surface 111, and the outer wall surface 112 is located outside the LiDAR 100.

When the adjusting structure 160 and the base 110 are integrally arranged, since the adjusting structure 160 is a protrusion on the bearing surface 111, the adjusting structure 160 increases a material of the base 110 on the one hand, and also increases a weight of the base 110 on the other hand. To reduce the material of the base 110 and the weight of the base 110, in this embodiment, a plurality of first heat dissipation grooves (not shown in the figures) can be arranged on the outer wall surface 112 of the base 110. Each of the first heat dissipation grooves is arranged in an orthographic projection region of each of the first convex platforms 161 on the outer wall surface 112. The first heat dissipation groove can also increase the outer surface area of the LiDAR 100, so that a heat dissipation performance of the LiDAR 100 can also be improved. The size and depth of the first heat dissipation groove depends on a specific requirement. Each of the first convex platforms 161 and each of the second convex platforms 162 can be correspondingly provided with one first heat dissipation groove or can be correspondingly provided with a plurality of the first heat dissipation grooves. When the base 110 has a sufficient material strength, the depth of the first heat dissipation groove can be greater than the minimum wall thickness of the base 110. Similarly, a plurality of second heat dissipation grooves 113 can also be provided on the outer wall surface 112. Each of the second heat dissipation grooves 113 is arranged in an orthographic projection region of each of the second convex platforms 162 on the outer wall surface 112 in a one-to-one correspondence. The first heat dissipation groove can dissipate heat for the reflecting module 120. The second heat dissipation groove 113 can dissipate heat for the laser transceiving module 140.

Figure 11:
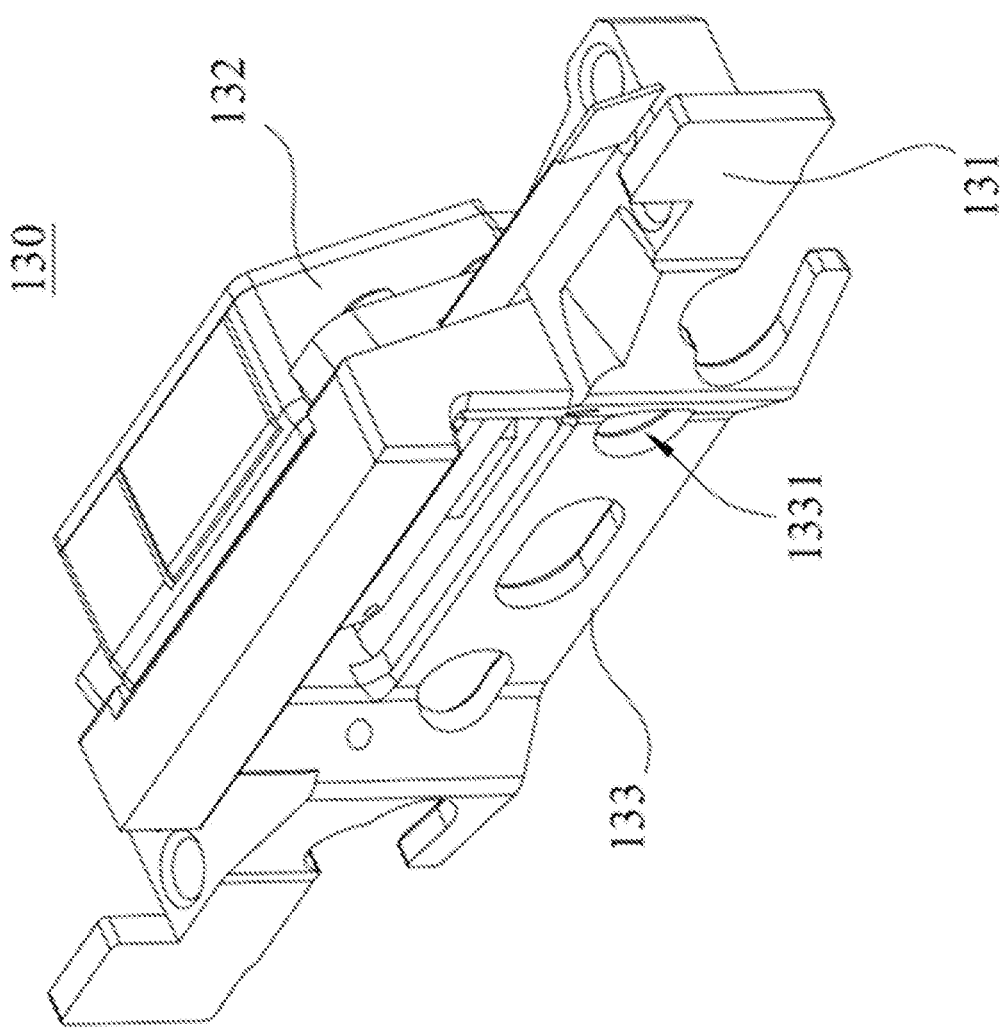
FIG. 11 shows a perspective diagram of a galvanometer module of an embodiment of this application.
Figure 12:
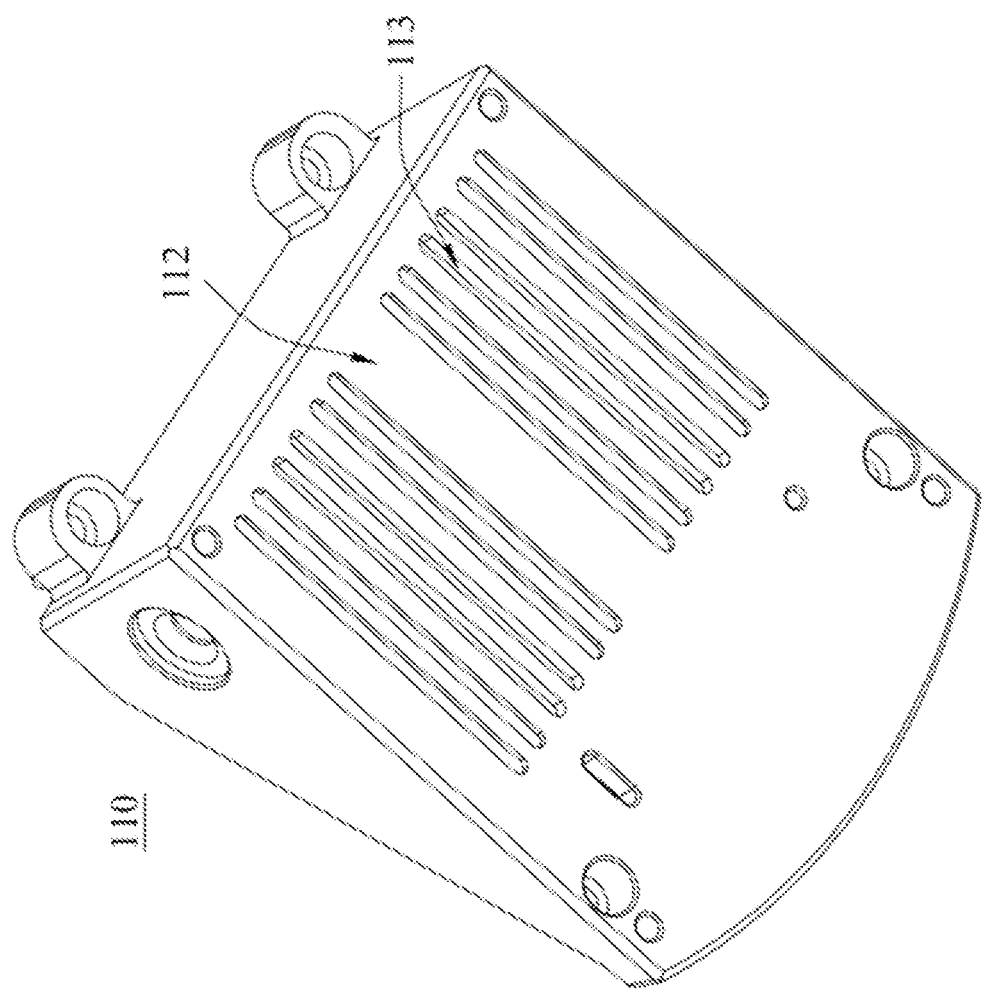
FIG. 12 shows a second perspective diagram of a base of an embodiment of this application.

When the laser transceiving module 140 and the reflecting module 120 are arranged on both sides of the galvanometer module 130, respectively, in order to direct the outgoing lasers generated by the laser transceiving module 140 to the reflecting module 120, the height of the galvanometer module 130 relative to the laser transceiving module 140 and the reflecting module 120 can be adjusted. In an embodiment, as shown in FIG. 11, the galvanometer module 130 can include a bracket 131 and a galvanometer device 132. The bracket 131 is connected to the bearing surface 111. The galvanometer device 132 is arranged on the bracket 131. The bracket 131 can include a clearance channel. The outgoing laser generated by each of the laser transceiving devices 141 passes through the clearance channel and is emitted to each of the mirrors 121 in a one-to-one correspondence. The bracket 131 is configured to raise the height of the galvanometer module 130. The clearance channel in the bracket 131 is configured to allow the laser transceiving module 140 to generate the outgoing laser to pass through and to be emitted to the reflecting module 120.

Specifically, the galvanometer module 130 can further include a light shielding plate 133. The light shielding plate 133 is arranged in the clearance channel for shielding light reflected by the reflecting module 120 to the laser transceiving module 140. The light shielding plate 133 can be a separate component and connected to the bracket 131. The light shielding plate 133 can also be integrally formed with the bracket 131. The light shielding plate 133 can prevent a stray light reflected by the reflecting module 120 from returning to the laser transceiving device 141, thereby affecting a detection accuracy. When the reflecting module 120 has a plurality of the mirrors 121, the light shielding plate 133 can include a plurality of relief holes 1331. An outgoing laser generated by each of the laser transceiving devices 141 correspondingly passes through one relief hole 1331 and is emitted to the mirror 121. That is, the number of the relief holes 1331 corresponds to the number of the laser transceiving devices 141 one by one. When the number of the laser transceiving devices 141 is the same as the number of the mirrors 121, the number of the laser transceiving devices 141, the mirrors 121, and the relief holes 1331 are the same. The sizes of the relief holes 1331 depend on an actual demand, which is not repeated here.

Figure 13:
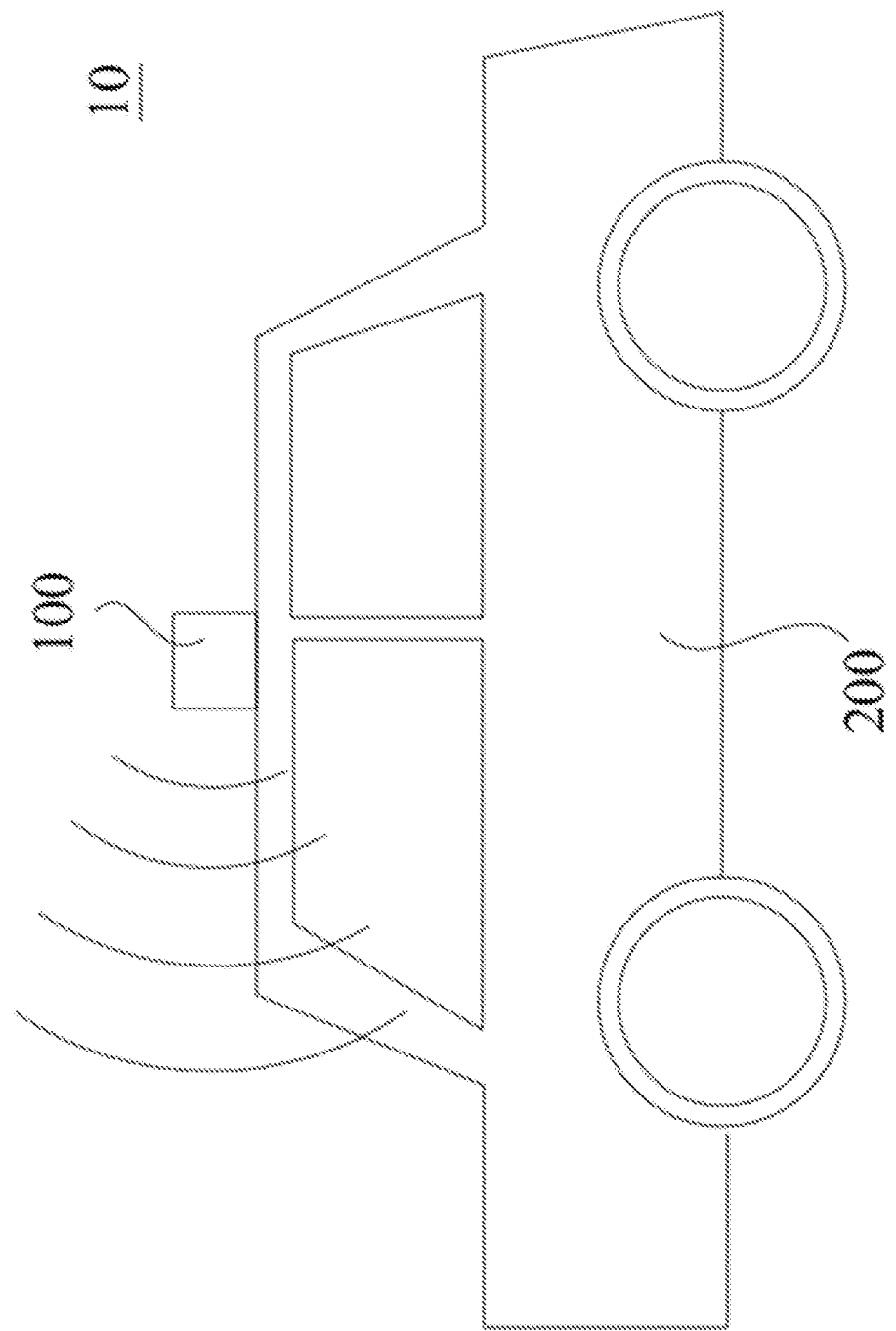
FIG. 13 shows a schematic diagram of an automobile of an embodiment of this application.
Figure 14:
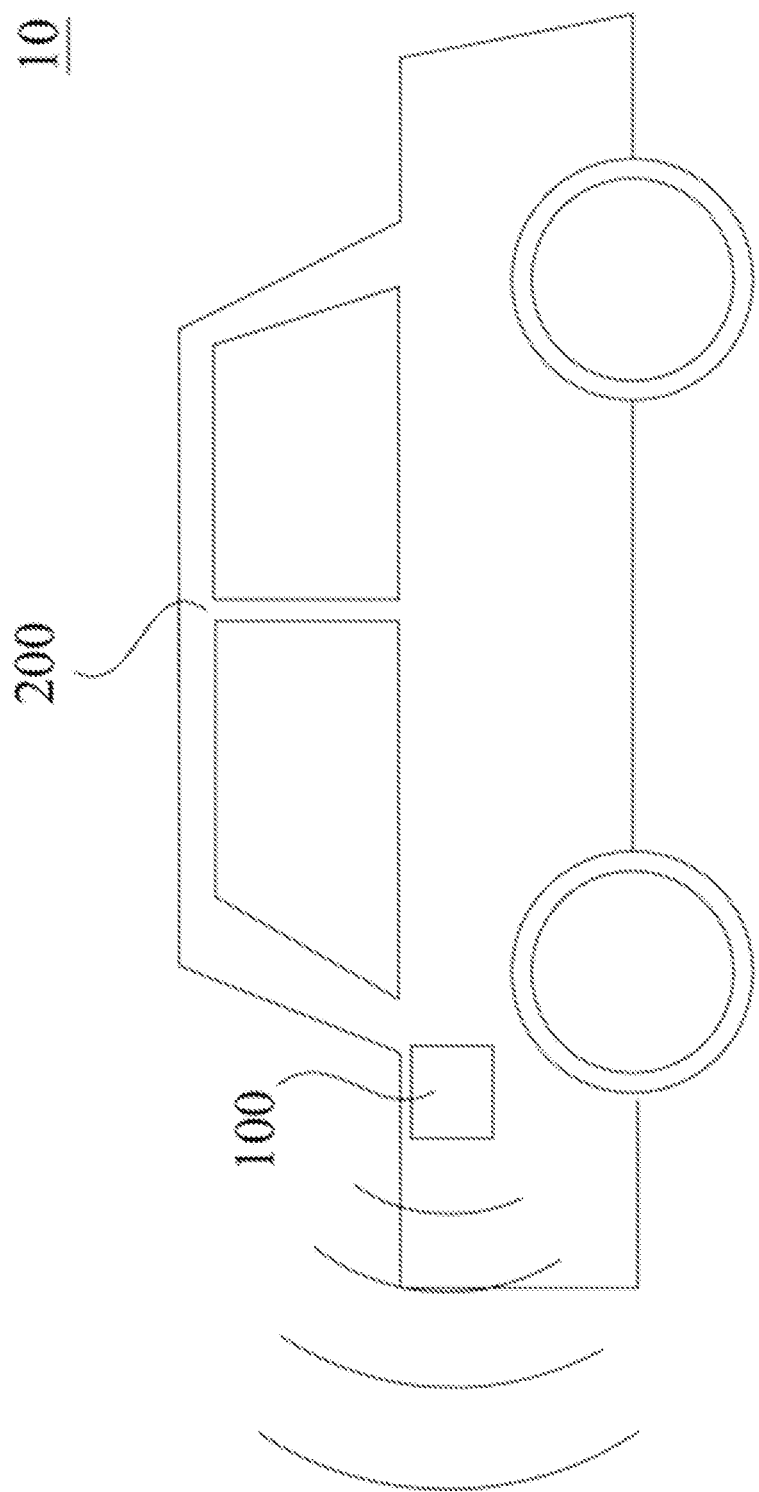
FIG. 14 shows a schematic diagram of an automobile of another embodiment of this application.

As shown in FIG. 13 and FIG. 14, the second aspect of the present application further provides an automobile 10, the automobile 10 includes the LiDAR 100 in any of the above embodiments. Specifically, the automobile 10 further includes an automobile body 200. The LiDAR 100 is mounted outside the automobile body 200 or embedded in the automobile body 200. When the LiDAR 100 is mounted outside the automobile body 200, the LiDAR 100 is preferably arranged on a roof of the automobile body 200.

The same or similar reference signs in the drawings of the embodiments correspond to the same or similar components. In descriptions of this application, it should be understood that orientation or position relationships indicated by terms such as "above," "under," "left," and "right" are based on the orientation or position relationships shown in the accompanying drawings, are merely intended to describe this application and simplify the descriptions, but are not intended to indicate or imply that the specified device or element shall have specific orientation or be formed and operated in specific orientation, and therefore, the terms for describing the position relationships in the drawings are only used for exemplary illustration, and should not be construed as a limitation on this patent. A person of ordinary skill in the art can understand specific meanings of the foregoing terms based on a specific situation.

The foregoing descriptions are only preferred embodiments of this application, and are not intended to limit this application. Any modification, equivalent replacement and improvement made within the spirit and principle of this application shall be included within the protection scope of this application.

What is claimed is:

1. A LiDAR, comprising:
    an intermediate optical path axis located in a middle of a detection area;
    a base comprising a bearing surface, wherein a galvanometer module of the LiDAR is fixed on the bearing surface;
    an adjusting structure located on the bearing surface;
    a laser transceiving module comprising a plurality of laser transceiving devices, wherein each of the laser transceiving devices is fixed to the adjusting structure, respectively, and each of the laser transceiving devices is configured to generate an outgoing laser emitted to the galvanometer module, respectively, and
    a reflecting module, wherein the reflecting module and the laser transceiving module are respectively arranged on two sides of the galvanometer module, the reflecting module comprises a plurality of mirrors, each of the mirrors is respectively arranged on the adjusting structure;
    wherein the adjusting structure is configured so that the farther away the mirror is from the intermediate optical path axis, the greater a distance from the mirror to the bearing surface is, each of the laser transceiving devices mounted on the adjusting structure has a corresponding distance from the bearing surface, so that a position of each of laser transceiving devices is corresponding to a position of each of the mirrors, and the outgoing lasers generated by each of the laser transceiving devices are reflected by the mirrors and form a preset laser detection field of view outside the LiDAR.

2. The LiDAR according to claim 1, wherein the adjusting structure comprises a plurality of first convex platforms arranged on the bearing surface, each of the laser transceiving devices is connected to each of the first convex platforms in a one-to-one correspondence, a measurement between a surface of each of the first convex platforms away from the bearing surface and the bearing surface in a direction that is perpendicular to the bearing surface is equal to a distance from the laser transceiving device connected to each of the first convex platforms to the bearing surface, and
    wherein each of the first convex platforms is integrally provided with the base.

3. The LiDAR according to claim 2, wherein the reflecting module faces a galvanometer surface of the galvanometer module, and
    wherein each of the mirrors is configured to reflect the outgoing laser generated by each of the laser transceiving devices to the galvanometer surface in a one-to-one correspondence.

4. The LiDAR according to claim 3, wherein the adjusting structure further comprises a plurality of second convex platforms arranged on the bearing surface, each of the mirrors is connected to each of the second convex platforms in a one-to-one correspondence, and a measurement between a surface of each of the second convex platforms away from the bearing surface and the bearing surface in a direction that is perpendicular to the bearing surface is equal to a distance from the mirror connected to each of the second convex platforms to the bearing surface, and
    wherein each of the second convex platforms is integrally provided with the base.

5. The LiDAR according to claim 4, wherein the plurality of mirrors are arranged around the galvanometer surface.

6. The LiDAR according to claim 5, wherein the base further comprises an outer wall surface opposite to the bearing surface, the outer wall surface is located outside the LiDAR, a plurality of first heat dissipation grooves are provided on the outer wall surface, and each of the first heat dissipation grooves is arranged within an orthographic projection area of each of the first convex platforms on the outer wall surface in a one-to-one correspondence.

7. The LiDAR according to claim 5, wherein the base further comprises an outer wall surface opposite to the bearing surface, the outer wall surface is located outside the LiDAR, a plurality of second heat dissipation grooves are provided on the outer wall surface, and each of the second heat dissipation grooves is arranged within an orthographic projection area of each of the second convex platforms on the outer wall surface in a one-to-one correspondence.

8. The LiDAR according to claim 3, wherein the galvanometer module comprises a bracket and a galvanometer device, the bracket is connected to the bearing surface, and the galvanometer device is arranged on the bracket, and
wherein the bracket comprises a clearance channel, and the outgoing laser generated by each of the laser transceiving devices passes through the clearance channel and is emitted to each of the mirrors in a one-to-one correspondence.

9. The LiDAR according to claim 8, wherein the galvanometer module further comprises a light shielding plate, the light shielding plate is arranged in the clearance channel for shielding light reflected by the reflecting module to the laser transceiving module, and
wherein the light shielding plate comprises a plurality of relief holes, and an outgoing laser generated by each of the laser transceiving devices correspondingly passes through one of the relief holes and is emitted to the mirror.

10. An automobile, comprising:
a LiDAR; and
an automobile body, wherein the LiDAR is mounted outside the automobile body or embedded in the automobile body, wherein the LiDAR further comprises:
an intermediate optical path axis located in a middle of a detection area;
a base comprising a bearing surface, wherein a galvanometer module of the LiDAR is fixed on the bearing surface;
an adjusting structure located on the bearing surface;
a laser transceiving module comprising a plurality of laser transceiving devices, wherein each of the laser transceiving devices is fixed to the adjusting structure, respectively, and each of the laser transceiving devices is configured to generate an outgoing laser emitted to the galvanometer module, respectively, and
a reflecting module, wherein the reflecting module and the laser transceiving module are respectively arranged on two sides of the galvanometer module, the reflecting module comprises a plurality of mirrors, each of the mirrors is respectively arranged on the adjusting structure;
wherein the adjusting structure is configured so that the farther away the mirror is from the intermediate optical path axis, the greater a distance from the mirror to the bearing surface is, each of the laser transceiving devices mounted on the adjusting structure has a corresponding distance from the bearing surface, so that a position of each of laser transceiving devices is corresponding to a position of each of the mirrors, and the outgoing lasers generated by each of the laser transceiving devices are reflected by the mirror and form a preset laser detection field of view outside the LiDAR.

* * * * *